United States Patent

Warren

(10) Patent No.: US 9,052,229 B2
(45) Date of Patent: Jun. 9, 2015

(54) DEVICES AND METHODS FOR LOSS-IN-WEIGHT INGREDIENT ADDITION

(75) Inventor: Jody Warren, Greer, SC (US)

(73) Assignee: FLUOR TECHNOLOGIES CORPORATION, Aliso Viejo, CA (US)

( * ) Notice: Subject to any disclaimer, the term of this patent is extended or adjusted under 35 U.S.C. 154(b) by 251 days.

(21) Appl. No.: 13/391,094

(22) PCT Filed: Aug. 17, 2009

(86) PCT No.: PCT/US2009/053993
§ 371 (c)(1),
(2), (4) Date: May 4, 2012

(87) PCT Pub. No.: WO2011/021994
PCT Pub. Date: Feb. 24, 2011

(65) Prior Publication Data
US 2012/0205391 A1    Aug. 16, 2012

(51) Int. Cl.
*G04F 5/00* (2006.01)
*G01G 11/08* (2006.01)

(52) U.S. Cl.
CPC .................................. *G01G 11/086* (2013.01)

(58) Field of Classification Search
CPC ..... G01G 11/00; G01G 11/003; G01G 11/02; G01G 11/04; G01G 11/08; G01G 11/083; G01G 11/086; G01G 13/00
USPC .......... 700/28, 29, 32, 34, 42, 43, 46, 68, 305
See application file for complete search history.

(56) References Cited

U.S. PATENT DOCUMENTS

| | | | |
|---|---|---|---|
| 3,743,461 A | 7/1973 | Williams | |
| RE29,944 E * | 3/1979 | Hyer et al. | ..................... 177/121 |
| 4,301,510 A | 11/1981 | Ricciardi et al. | |
| 4,867,343 A | 9/1989 | Ricciardi et al. | |
| 4,882,784 A | 11/1989 | Tump | |
| 5,695,092 A | 12/1997 | Schrandt | |
| 6,170,319 B1 | 1/2001 | Chen et al. | |
| 6,446,836 B1 | 9/2002 | Aalto et al. | |
| 2003/0105536 A1 | 6/2003 | Corbelli | |
| 2008/0159875 A1 | 7/2008 | Wilke | |

FOREIGN PATENT DOCUMENTS

| | | |
|---|---|---|
| CA | 2476338 | 1/2005 |
| CA | 2607347 | 11/2006 |
| JP | 60-091221 | 5/1985 |
| JP | 07-139990 | 2/1995 |
| WO | 2004/108263 | 12/2004 |

* cited by examiner

OTHER PUBLICATIONS

"Loss in Weight Rate Control", Hardy Instruments, San Diego, CA, 2009.

*Primary Examiner* — Mohammad Ali
*Assistant Examiner* — Nathan Laughlin
(74) *Attorney, Agent, or Firm* — Fish & Tsang, LLP

(57) ABSTRACT

Dispensing systems and methods contemplated herein are configured to adjust a first continuous product flow rate to a second continuous but variable flow rate in at least two control modes. Most preferably, a moving average is determined for the second flow rate to provide a first level of control, and a loss-in-weight feedback is determined for the first flow rate to provide a second, finer level of control, which will be abandoned when the feedback moves beyond a predetermined threshold relative to a calculated product flow rate.

20 Claims, 1 Drawing Sheet

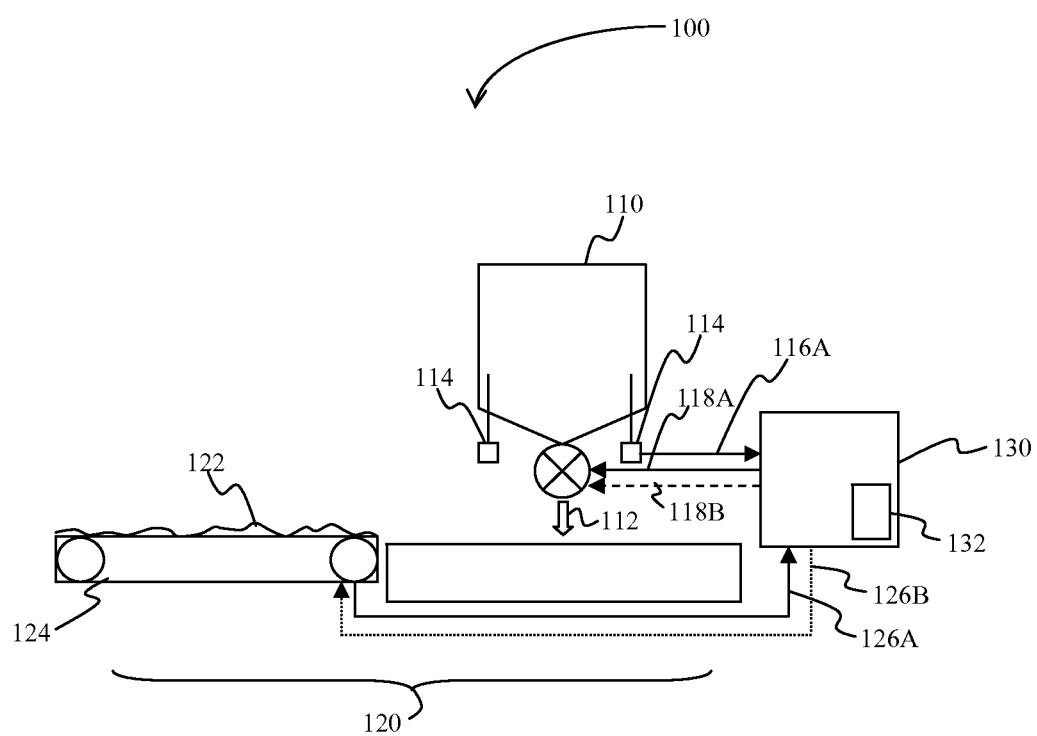

DEVICES AND METHODS FOR LOSS-IN-WEIGHT INGREDIENT ADDITION

FIELD OF THE INVENTION

The field of the invention is dispensing materials, especially automated dispensing of a first material at a flow rate and quantity that is dependent on the dispensed quantity and/or flow rate of a second dispensed material.

BACKGROUND OF THE INVENTION

Automation in dispensing materials is often performed using one or more weighing devices to quantify flow of a product at a particular location. For example, dispensation from a feed source can be monitored/controlled using a loss-in-weight feeder in which load cells on the feed source provide a quantitative signal indicating the actual material flow. In further downstream locations, belt scales can be used to provide a quantitative measure of material flow. Typical examples for such devices and methods are shown in U.S. Pat. Nos. 5,081,600 and 6,446,836, and 5,296,654.

While such devices and methods are often satisfactory for situations where the flow of the material must remain constant, currently known devices and methods have significant difficulties where the flow rate of a first material needs to be adjusted to a variable flow rate of a second material to retain a substantially constant ratio of the first and second materials. To circumvent problems associated with variable flow rates, the continuous flow rate may be at least temporarily converted to a batch process where a fixed quantity of the first material is added to the second material once the second material has reached a predetermined weight in a holding or otherwise accumulating device. While such batch processing advantageously increases accuracy of the ratio between first and second materials, batch processing is not always suitable for all operations.

Consequently, although various configurations and methods for dispensing materials are known in the art, all or almost all of them suffer from one or more disadvantages. Thus, there is still a need to provide improved methods and configurations for dispensing a material at a flow rate and quantity that is a function of the flow rate and quantity of another material.

SUMMARY OF THE INVENTION

The present invention is directed to devices and methods for adjusting the feed rate of a continuously flowing material to a variable feed rate of another continuously moving material, thus allowing combination of the materials at a constant and predetermined ratio. Most preferably, the one material is dispensed from a loss-in-weight feeder while the other material is provided via a conveyor belt with a weigh belt. Adjustment in preferred devices and methods is automated and controlled via a PLC (programmable logic controller) that includes a PID (proportional-integral-derivative) controller.

In one aspect of the inventive subject matter, a method of adjusting a first feed rate of a continuously flowing first material from a feeder to a variable second feed rate of a continuously moving second material on a conveyor includes a step of feeding a plurality of first signals from a weigh belt coupled to the conveyor and a plurality of second signals from a feeder load cell to a PLC. The PLC is then used to (a) calculate the first feed rate based on a moving average of the plurality of first signals, (b) set the feeder to the calculated first feed rate to so operate the feeder in an open loop mode, and (c) calculate and set a corrected feed rate based on the plurality of second signals to so operate the feeder in a closed loop mode when the corrected feed rate and the first feed rate have a difference less than a predetermined amount. When the corrected feed rate and the first feed rate have a difference more than the predetermined amount (e.g., at least 20%), the PLC reverts back to open loop mode. It is also contemplated that the PLC reverts to open loop mode when the plurality of second signals are indicative of a low level at which a feeder refill is requested. Most typically, the feeder load cell is part of a loss-in-weight feeder, and the conveyor comprises a weigh belt.

In particularly contemplated methods, it is preferred that the variable second feed rate has substantial variability, typically at least 10%, more typically at least 20%, and even more typically at least 35%. It is further generally preferred that the plurality of first signals and/or the plurality of second signals correspond to weight measurement signals taken at a frequency of between 1 min$^{-1}$ and 1 s$^{-1}$. Especially at relatively lower frequencies, it is preferred that the moving average is an exponentially weighted moving average, however, many other moving average determinations are also deemed suitable. Where needed, the PLC may further be programmed to allow manual mode to control the first and/or second feed rate.

With respect to the determination of the calculation of the corrected feed rate it is preferred that the programmable logic controller comprises a PID controller that calculates and sets the corrected feed rate.

Thus, and viewed from a different perspective, a method of controlling continuous flow of a material will include a step of calculating a first material flow requirement based on a moving average quantification of a second material flow (the second material flow will have substantial variability, typically at least 10%, more typically at least 20%, and most typically at least 30%). In another step, feedback quantification of an actual first material flow is used to adjust the calculated first material flow requirement to so obtain a corrected first material flow, and feedback quantification is ignored when the first material flow requirement differs from the corrected first material flow in at least a predetermined amount (e.g., at least 20%).

Most typically, the moving average quantification is calculated in a PLC (e.g., as exponentially weighted moving average), and the calculated first material flow requirement is determined using a PID controller unit of the PLC. For example, the moving average quantification may be based on a plurality of signals from a weigh belt and the feedback quantification may be based on a plurality of signals from a loss-in-weight feeder.

Consequently, a plant is contemplated that includes a feeder that continuously provides a first material at a first feed rate to a conveyor that continuously provides variable amounts of a second material at a variable second feed rate. A PLC is operationally coupled to a weigh belt of the conveyor and receives a plurality of first signals from the weigh belt and a plurality of second signals from a load cell of the feeder. It is generally preferred that the PLC is programmed to calculate and/or set the first feed rate of the first material based on a moving average of the plurality of first signals to so operate the feeder in an open loop mode, and that the PLC is further programmed to calculate and/or set a corrected feed rate based on the plurality of second signals to so operate the feeder in a closed loop mode when the corrected feed rate and the first feed rate have a difference less than a predetermined amount (e.g., less than 20%). It is still further preferred that the programmable logic controller is also programmed to revert to the open loop mode when the corrected feed rate and the first feed rate have a difference more than the predetermined amount (e.g., at least 20%).

As before, it is preferred that the moving average quantification is determined in the PLC and is an exponentially weighted moving average, and that a PID controller calculates the corrected feed rate. Additionally, it is preferred that the PLC is programmed to allow manual control of the first and/or second feed rate.

Various objects, features, aspects and advantages of the present invention will become more apparent from the following detailed description of preferred embodiments of the invention.

BRIEF DESCRIPTION OF THE DRAWING

FIG. 1 is an exemplary schematic illustration of a continuous ingredient system according to the inventive subject matter.

DETAILED DESCRIPTION

The present invention is directed to devices and methods for continuous addition of one material to a continuous and variable stream of another material at a predetermined ratio. Most preferably, contemplated systems and methods employ a combination of hardware and software to accurately and flexibly control the combination of materials in predetermined ratios.

Most preferably, contemplated systems and methods use a PLC in combination with a weigh belt of a conveyor system and a loss-in-weight feeder having one or more load cells. In especially preferred systems and methods, the PLC receives load signals from the weigh belt and calculates a setpoint (e.g., via an earned weight moving average filter) for the feeder in an open loop control. The PLC further receives load signals from the load cells of the loss-in-weight feeder, which are then used as a feedback signal in the PLC to so operate in closed loop control. Most typically, a PID controller in the PLC will be used to control the rate of ingredient addition from the feeder in the closed loop control. To maintain large-grain and fine-grain control, the PLC reverts to open-loop control when at any time the filtered setpoint and feedback are more than predetermined value (e.g., 20%) apart. It is further generally preferred that the PLC reverts to open loop any time the feeder is below a certain weight (e.g., when a refill is requested).

Thus, it should be appreciated that devices and methods according to the inventive subject matter will allow replacement of individually controlled hardware for batch operation with software based PLC control that not only reduces points of failure, but also improves performance through use of flexible operating modes. In contemplated systems and methods, three modes of operation are available to the operator, a manual setting/fixed rate, open loop mode, and closed loop mode. Most typically, the setpoint for open loop mode form can be calculated as y=mx+b where x is motor speed (e.g., for feeder auger) and y is the flow rate (e.g., measured lbs/hr). Closed-loop feedback control through a PID controller contained in the PLC can be implemented by calculating the loss-in-weight in, for example, one second intervals, and a calculation in the PLC will determine when it is applicable to close the loop for tighter control. Among various other advantages, it should be noted that such system will perform especially well in continuous operations due of the linear nature of material addition. Furthermore, it should be noted that since contemplated systems and methods are software based, they can be adjusted for use with different materials and processes.

Moreover, stand-alone controllers are eliminated, which also eliminates a point of failure and a source of error.

One exemplary configuration is schematically depicted in FIG. 1 where dispensing system 100 includes a feeder 110 that provides a first material 112 to the conveyor 120 that includes a weigh belt 124 weighing the variable continuous flow of the second material 122. The feeder 110 and the conveyor 120 are coupled to the PLC 130 that further preferably includes a PID controller 132. In the example of FIG. 1, the weigh belt 124 provides first signals 126A to the PLC 130, which may further provide signals 126B to the conveyor (typically the drive mechanism) to control operation of the conveyor. The PLC also receives second signals 116 from the load cells 114 of the feeder 110, and provides first and corrected signals 118A/118B to the dispensing mechanism (e.g., auger drive) of the feeder 110.

In a typical use of such dispensing system, a first feed rate of a normally continuously flowing first material from a feeder can be adjusted to a variable second feed rate (e.g., varies at least 5% from average, more typically at least 10% from average, most typically at least 15% from average) of a continuously moving second material on a conveyor. In such method, it is generally preferred that a plurality of first signals from the weigh belt that is coupled to the conveyor and a plurality of second signals from a feeder load cell are transmitted to a PLC. The PLC is then used to calculate the first feed rate based on a moving average of the plurality of first signals, and further used to set the feeder to the calculated first feed rate to so operate the feeder in an open loop. It is further especially preferred to use the PLC to calculate and set a corrected feed rate based on the plurality of second signals (via calculation, typically using a moving average calculation) to so operate the feeder in a closed loop under conditions where the corrected feed rate and the first feed rate have a difference that is less than a predetermined amount. The PLC will revert to the open loop when the corrected feed rate and the first feed rate have a difference that is greater than the predetermined amount.

Of course, it should be recognized that contemplated systems and methods may be modified in various manners without departing from the inventive concept presented herein. For example, the conveyor system need not necessarily be a conveyor belt system with a weigh belt, but may indeed be any system that is capable to deliver a continuous flow of the second material at a variable flow rate. Therefore, suitable alternative implements include chutes, pipes (using gravity or a gas/fluid to propel the second material), augers, buckets, etc. Consequently, the weigh belt may be replaced by various alternative devices for quantitation, and suitable devices will include batch scales, piezo scales, loss-in-weight systems, and optical systems that translate material density (especially for large particulate material) to a calculated weight.

Consequently, and dependent on the type of material conveyed and quantification system used, it should be noted that the first and second weight measurement signals may be taken at various intervals. However, it is generally preferred that the weight measurement signals are taken or transferred to the PLC at a frequency of between $1\ min^{-1}$ and $1\ s^{-1}$.

With respect to the variability of the flow rate of the second material it is generally contemplated that the variability is relatively large and will be at least 5% from a long term average, more typically at least 10% from a long term average, even more typically at least 20% from a long term average, and most typically at least 30% from a long term average, wherein the long term average is measured over a period of at least 100-fold the duration of a deviation from an average. Variability of flow rate may be due to various reasons, including variability in supply to the conveyor, grouping (e.g., due to rolling of the material on the conveyor) or clumping of the material, and the variability may be periodic or entirely random. Regardless of the type and amount of the variability it is generally preferred that the signals from the quantification device (typically a weigh belt) are directly transmitted to the PLC, most commonly by wire or RF signal. However, in less preferred aspects, the quantification device may already provide at least a portion of signal processing.

The PLC will preferably be programmed to calculate from the signals from the quantification device a calculated or corrected feed rate that is typically translated into a control signal to the feeder mechanism (e.g., control signal to feed auger, pump, or weir) to so control the feed rate. As will be readily appreciated, there are numerous calculations that will be suitable for use in conjunction with the teachings presented herein. However, it is typically preferred that the calculation will include a smoothing/filtering of the data received from the quantification device such that small deviations will be reduced but larger deviations and/or trends will be considered. For example, suitable smoothing/filtering may be implemented by averaging multiple signals over a predetermined interval to so produce a moving average. Such moving average calculation may further be weighted in some manner to so provide a more accurate calculation. For example, weighting may be by time delay, signal difference, cumulative change, etc. However, in most instances, an exponential or earned weighted moving average will be preferred. With respect to the length of the interval of the moving average, it should be noted that the person of ordinary skill in the art will be readily able to select a suitable length without undue experimentation.

Based on the calculation of the average weight, the desired fraction of material to be added, and the feeder mechanism, the PLC will then determine and set in an open loop mode the calculated first fed rate. Of course, it should be appreciated that any change in measure weight on the conveyor will lead to a newly determined average weight and with that a newly determined/corrected feed rate. Provided the corrected feed rate and the first feed rate have a difference less than a predetermined amount, the PLC will then switch to a closed loop mode in which the plurality of second signals are used as a feedback signal.

With respect to the plurality of second signals it should be appreciated that the type of second signals will generally depend on the type and/or number of load cells. Moreover, it should be appreciated that while a loss-in-weight load cell feeder is preferred, numerous other quantification devices to provide feedback are also deemed suitable and include batch scales, other loss-in-weight devices, weigh belts, image-analysis based devices, etc. The feedback calculation is most preferably performed using a PID controller that is suitable programmed and preferably part of the PLC. Such feedback control will advantageously improve accuracy and reliability of the material dispensation.

However, and particularly where the variability in feed rate has a rapid change or relatively significant spike it is typically preferred that the PLC switches from the closed loop mode to the open loop mode to so allow for a relatively fast correction. As soon as the variability is reduced or has been otherwise stabilized, the PLC will once more revert to closed loop mode. Most typically, the switch from the closed loop mode to the open loop mode will be triggered when the difference between the first feed rate and the corrected feed rate is at least 5%, more typically at least 10%, even more typically at least 15%, and most typically at least 20%. Additional triggering events that will cause the PLC to switch from the closed loop mode to the open loop mode include those in which the feedback signal is expected to be compromised. For example, such situations include refills of the feeder, servicing the feeder, switching feed material, etc. Of course, it is generally preferred that the PLC also provides a manual control mode in which the feed rate of the feeder and the feed rate of the conveyor can be modified.

In still further contemplated systems and methods it should be appreciated that the PLC may also be programmed to modify the feed rate of the second material on the conveyor (or other material transport system). For example, where the plurality of first signals indicate that the variability has a relatively small amplitude but high frequency, the feed rate of the second material may be slowed. On the other hand, and especially where relatively large and periodic amplitudes are measured, the PLC may be programmed to counteract such variations by modulation of the speed of the conveyor. Of course, the modulation of the feed rate of the second material on the conveyor may be performed in conjunction with the correction of the first feed rate, or independently.

Therefore, and viewed from another perspective, a method of controlling continuous flow of a material will include a step of calculating a first material flow requirement based on a moving average quantification of a second material flow that has a substantial variability (e.g., variability of at least 10%, more typically at least 20%, most typically at least 25%), and another step of using feedback quantification of an actual first material flow to adjust the calculated first material flow requirement to obtain a corrected first material flow. In yet another step, the feedback quantification is ignored when the first material flow requirement differs from the corrected first material flow in at least a predetermined amount, which is typically a value of at least 50% (and more typically at least 75%) of the variability. In particularly preferred methods, PLC-based devices and methods as described above are employed in such methods, wherein the calculated first material flow requirement is determined using a PID controller.

Therefore, plants are contemplated in which a feeder is configured to continuously provide a first material at a first feed rate to a conveyor, wherein the conveyor is configured to continuously provide variable amounts of a second material at a variable second feed rate. A programmable logic controller is operationally coupled to a weigh belt of the conveyor and receives a plurality of first signals from the weigh belt, and also operationally coupled to a feeder load cell of the feeder and receives a plurality of second signals from the feeder load cell. In particularly preferred plants, the PLC is programmed to calculate and/or set the first feed rate of the first material based on a moving average of the plurality of first signals to so operate the feeder in an open loop, and the PLC is further preferably programmed to calculate and set a corrected feed rate based on the plurality of second signals to so operate the feeder in a closed loop when the corrected feed rate and the first feed rate have a difference less than a predetermined amount. As noted before, it is typically also preferred that the PLC is further programmed to revert to the open loop when the corrected feed rate and the first feed rate have a difference more than the predetermined amount. Thus, it should be appreciated that contemplated configurations and methods can be in numerous plants in which a loss-in-weight minor ingredient addition is part of the plant operation. Normally, such loss-in-weight addition is performed using a stand-alone solution, which is not only expensive, but also adds potential points of error and has significantly less operational flexibility as compared to the systems and methods contemplated herein.

Thus, specific embodiments and applications of devices and methods for loss-in-weight ingredient addition have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of adjusting a first feed rate of a continuously flowing first material from a feeder to a variable second feed rate of a continuously moving second material on a conveyor, the method comprising:
   feeding a plurality of first signals from a weigh belt coupled to the conveyor and a plurality of second signals from a feeder load cell to a programmable logic controller;
   using the programmable logic controller to calculate the first feed rate of the first material based on a moving average of the plurality of first signals, wherein the plurality of first signals corresponds to weight of the second material;
   using the programmable logic controller to set the feeder to the calculated first feed rate to so operate the feeder in an open loop;
   using the programmable logic controller to calculate and set a corrected feed rate based on the plurality of second signals from the load cell to so operate the feeder in a closed loop when the corrected feed rate and the first feed rate have a difference less than a predetermined amount; and
   reverting to the open loop when the corrected feed rate and the first feed rate have a difference more than the predetermined amount.

2. The method of claim 1 wherein the variable second feed rate has a variability of at least 20%.

3. The method of claim 1 wherein at least one of the plurality of first signals and the plurality of second signals correspond to weight measurement signals taken at a frequency of between 1 min$^{-1}$ and 1 s$^{-1}$.

4. The method of claim 1 wherein the moving average is an exponentially weighted moving average.

5. The method of claim 1 wherein the programmable logic controller comprises a proportional-integral-derivative controller that calculates and sets the corrected feed rate.

6. The method of claim 1 wherein the feeder load cell is part of a loss-in-weight feeder.

7. The method of claim 1 wherein the predetermined amount is an at least 20% difference between the first feed rate and the corrected feed rate.

8. The method of claim 1 further comprising a step of reverting to the open loop when the plurality of second signals are indicative of a low level at which a feeder refill is requested.

9. The method of claim 1 wherein the programmable logic controller further allows for manual control.

10. A method of controlling a continuous flow of a material, the method comprising:
    calculating a first material flow requirement for a first material based on a moving average quantification of a second material flow of a second material that has a variability of at least 20%;
    using feedback quantification of an actual first material flow to adjust the calculated first material flow requirement to obtain a corrected first material flow to thereby achieve fine-grain control over the first material flow; and
    ignoring the feedback quantification when the first material flow requirement differs from the corrected first material flow in at least a predetermined amount to thereby achieve large-grain control over the first material flow.

11. The method of claim 10 wherein the moving average quantification is calculated in a programmable logic controller.

12. The method of claim 10 wherein the calculated first material flow requirement is determined using a proportional-integral-derivative controller of the programmable logic controller.

13. The method of claim 10 wherein the moving average quantification is based on a plurality of signals from a weigh belt and wherein the feedback quantification is based on a plurality of signals from a loss-in-weight feeder.

14. The method of claim 10 wherein the feedback quantification is ignored when the first material flow requirement differs from the corrected first material flow at least 20%.

15. A plant comprising:
    a feeder that is configured to continuously provide a first material at a first feed rate to a conveyor, wherein the conveyor is configured to continuously provide variable amounts of a second material at a variable second feed rate;
    a programmable logic controller operationally coupled to a weigh belt of the conveyor and configured to receive a plurality of first signals from the weigh belt, and further operationally coupled to a feeder load cell of the feeder and configured to receive a plurality of second signals from the feeder load cell;
    wherein the programmable logic controller is programmed to at least one of calculate and set the first feed rate of the first material based on a moving average of the plurality of first signals corresponding to weight of the second material to so operate the feeder in an open loop;
    wherein the programmable logic controller is further programmed to calculate and set a corrected feed rate for the first material based on the plurality of second signals to so operate the feeder in a closed loop when the corrected feed rate and the first feed rate have a difference less than a predetermined amount; and
    wherein the programmable logic controller is still further programmed to revert to the open loop when the corrected feed rate and the first feed rate have a difference more than the predetermined amount.

16. The plant of claim 15 wherein the moving average is an exponentially weighted moving average.

17. The plant of claim 15 wherein the programmable logic controller comprises a proportional-integral-derivative controller that is programmed to calculate the corrected feed rate.

18. The plant of claim 15 wherein the predetermined amount is at least 20%.

19. The plant of claim 15 wherein the programmable logic controller is still further programmed to allow manual control of the first feed rate.

20. The plant of claim 15 wherein the programmable logic controller is still further programmed to allow adjustment of the second feed rate.

* * * * *